No. 12,471. REISSUED APR. 10, 1906.

I. M. THOMPSON.

WINDOW KITCHEN.

APPLICATION FILED FEB. 5, 1906.

Witnesses.

Geo. E. Barnes

G. Wilson.

Inventor

IDA MAY THOMPSON.

By her Attorney

Edward N. Pagelsen.

UNITED STATES PATENT OFFICE.

IDA MAY THOMPSON, OF JAMESTOWN, NORTH DAKOTA.

WINDOW-KITCHEN.

No. 12,471. Specification of Reissued Letters Patent. Reissued April 10, 1906.

Original No. 803,938, dated November 7, 1905. Application for reissue filed February 5, 1906. Serial No. 299,635.

*To all whom it may concern:*

Be it known that I, IDA MAY THOMPSON, a citizen of the United States, residing at Jamestown, in the county of Stutsman and State of North Dakota, have invented new and useful Improvements in Window-Kitchens, of which the following is a specification.

The invention relates to a device for use in connection with alcohol, oil, or other small stoves adapted for insertion in an open window, the sash of which acts as a means for holding the device in desired position.

The object of the invention is the production of a device such as described which shall be simply constructed of sheet metal or the like, adjustable to any size window, and especially adapted for use in hospitals, sick-rooms, flat-apartments, and other places where it is desired to use an oil or alcohol stove for cooking purposes, but where the odor emitted from such stoves in use would be particularly objectionable.

The invention will be first described in connection with the accompanying drawings, and then pointed out in the claims.

Figure 1:
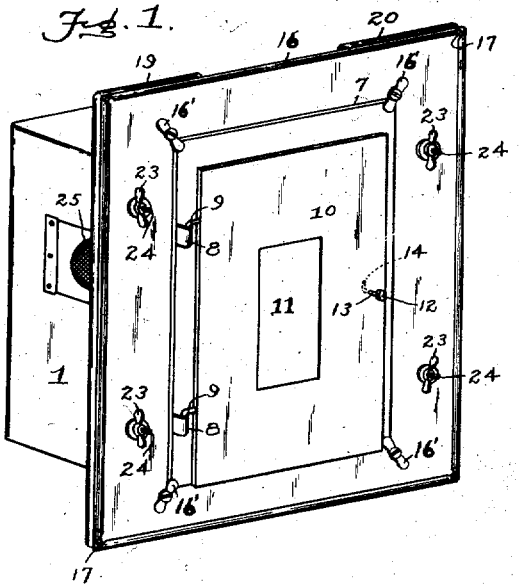
Figure 2:
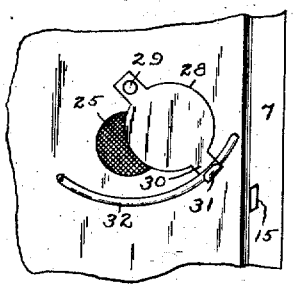
Figure 3:
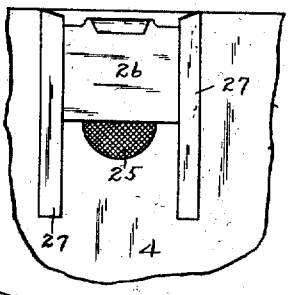
Figure 4:
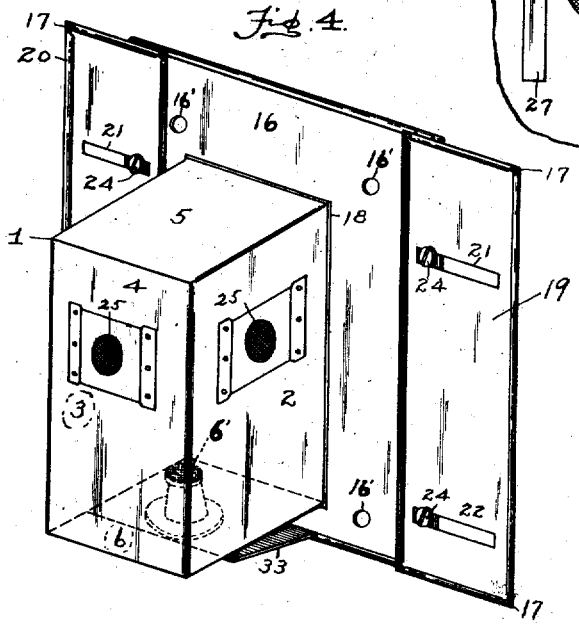

In the drawings, Figure 1 is a perspective of the device. Fig. 2 is a broken elevation illustrating the ventilator in one of the side walls. Fig. 3 is a broken elevation showing the ventilator in the rear wall. Fig. 4 is a perspective of the device from the rear.

Referring to the drawings, in which like figures of reference indicate like parts throughout the several views, 1 denotes the hollow rectangular body portion of the device in which the stove is placed when in use. This body portion is formed of side walls 2 and 3, rear wall 4, top 5, and floor 6, designed to support a stove 6′, the floor and stove being both shown in dotted lines in Fig. 4. Sides 2 and 3 and top 5 are bent at right angles at their front edges to form flange 7. Gudgeons 8, formed on one side of flange 7, receive pintles 9, rigidly fixed on door 10, which forms the front wall of the stove-chamber. A window 11 in said door provides means when the latter is closed for inspecting the contents of the chamber. When desired, the door may be opened by knob 12, the shaft 13 of which is bent at an angle at 14 and is adapted to enter opening 15 in flange 7 and lock the door.

A rectangular draft-shield 16, designed to prevent a draft of air from entering the room when the device is in position in the window, comprises a flat wall, the edges of which are bent upon themselves around a wire 17 to form a smooth round rim, is formed with a central opening 18 to receive the body portion 1 of the device, and when in normal position abuts flange 7, clamping-buttons 16′, secured in shield 16, holding said flange and shield in rigid contact, as shown in Fig. 1.

Two wings 19 and 20, formed with edges similar to those of shield 16, are adapted for lateral adjustment through the medium of slots 21 and 22 in coöperation with set-screws 23 and bolts 24, which pass through draft-shield 16 and said wings.

Ventilating-apertures 25 in both side walls and rear wall permit free circulation of air within the body portion and form simple and effective means for permitting escape of any odor arising from the use of the stove.

A damper 26, vertically slidable in guides 27, is adapted to cover aperture 25 in the rear wall 4 of the body portion to regulate the ingress and egress of air at this point consistently with the needs of the occasion.

A circular damper 28, pivoted at 29 in each side wall to overlie apertures 25, is formed with a depending neck 30 and finger-grip 31, said neck passing beneath and frictionally engaging an arcuate guide 32, the finger-grip enabling the operator to position the damper as may be desired.

33 is a shelf comprising a strip bent to provide a top plate and an angularly-projecting lower plate to brace the top plate, the shelf projecting rearwardly from shield 16, the top plate of said shelf supporting the body portion 1 and the lower plate extending from the free edge of the top plate and secured on the rim of the shield 16, all as clearly shown in Fig. 4.

In use the sash of a window is lowered upon the top of the body portion, the door of which of course opens into the room, and is thus securely held in position. Wings 19 and 20 can be adjusted to supplement shield 16, if this prove too small in preventing an objectionable current of air entering the room. When properly positioned, a stove is placed in the body portion and the ventilating-apertures regulated as desired, when cooking can proceed as usual, all odor being carried off outside of the apartment by means of circulation of air through the ventilating-apertures, as will be obvious.

Having thus described what I claim to be

BEST AVAILABLE COPY new and patentable, what I desire to secure and protect by Letters Patent is—

1. A device of the character described, comprising a body portion, a shield projecting transversely at one side thereof, and an adjustable extension at one edge of the shield.

2. A device of the character described, comprising a body portion having ventilating-openings, a shield projecting transversely of the body portion, and extensions connected to the edges of the shield.

3. A device of the character described, comprising a rectangular body formed with openings in its respective walls, a shield projecting transversely of the body at one side thereof, and wings adjustably connected with the side edges of the shield.

4. A device of the character described, comprising a body portion open at its front side, the walls of the body being formed with openings, dampers for said openings, the forward edges of the body-walls being bent to provide a face-flange, a door pivotally connected to said flange, a shield encircling the body in rear of the flange, means for removably connecting the shield and flange, and wings adjustably connected to said shield.

5. A device of the character described comprising a rectangular body formed with openings in its respective walls, a shield projecting transversely of the body at one side thereof, and wings adjustably connected with the side edges of the shield, and a shelf projecting from the shield and supporting the body portion.

In testimony whereof I have affixed my signature in the presence of two subscribing witnesses.

IDA MAY THOMPSON.

Witnesses:

J. J. THOMPSON,

ALFRED DAVIS.